(12) United States Patent
Jiang (10) Patent No.: US 10,870,606 B2
(45) Date of Patent: Dec. 22, 2020

(54) POLYCRYSTALLINE DIAMOND COMPRISING NANOSTRUCTURED POLYCRYSTALLINE DIAMOND PARTICLES AND METHOD OF MAKING THE SAME

(71) Applicant: Wenhui Jiang, Pearland, TX (US)

(72) Inventor: Wenhui Jiang, Pearland, TX (US)

( * ) Notice: Subject to any disclaimer, the term of this patent is extended or adjusted under 35 U.S.C. 154(b) by 117 days.

(21) Appl. No.: 16/262,529

(22) Filed: Jan. 30, 2019

(65) Prior Publication Data

US 2020/0239370 A1 Jul. 30, 2020

Related U.S. Application Data

(60) Provisional application No. 62/638,573, filed on Mar. 5, 2018.

(51) Int. Cl.
| | |
|---|---|
| *C04B 35/52* | (2006.01) |
| *C04B 35/645* | (2006.01) |
| *B01J 3/08* | (2006.01) |
| *E21B 10/567* | (2006.01) |

(52) U.S. Cl.
CPC ............. *C04B 35/52* (2013.01); *B01J 3/08* (2013.01); *C04B 35/645* (2013.01); *E21B 10/567* (2013.01); *B01J 2203/0655* (2013.01); *C04B 2235/3847* (2013.01);
(Continued)

(58) Field of Classification Search
USPC ...................................... 51/309, 298; 423/446
See application file for complete search history.

(56) References Cited

U.S. PATENT DOCUMENTS

| | | | |
|---|---|---|---|
| 5,127,923 A | * | 7/1992 | Bunting ................ B24D 3/007 51/293 |
| 6,592,985 B2 | | 7/2003 | Griffin et al. |
| 6,852,414 B1 | | 2/2005 | Frushour |

(Continued)

OTHER PUBLICATIONS

E. A. Ekimov, et al. Mechanical Properties and Microstructure of Diamond-SiC Nanocomposite, Inorganic Materials, Nov. 2002, 1117-1122, 38-11, Pleiades Publishing, Ltd, Tortola, British Virgin Islands.

(Continued)

*Primary Examiner* — Nina Bhat (57) ABSTRACT

A polycrystalline diamond and a polycrystalline diamond compact comprise nanostructured polycrystalline diamond particles (aggregates) and binder material. The nanostructured polycrystalline diamond particles (aggregates) are from starting raw materials of nanostructured polycrystalline diamond particles (aggregates) with a size of between 1 μm-40 μm. The polycrystalline diamond and the polycrystalline diamond compact may comprise micrometer-sized monocrystalline diamond particles. The binder material in the polycrystalline diamond or the polycrystalline diamond compact may be removed partially or completely by a leaching process. The method of making the polycrystalline diamond or the polycrystalline diamond compact comprises sintering diamond particles comprising the nanostructured polycrystalline diamond particles (aggregates) with a size of between 1 μm-40 μm under high temperature and high pressure in the presence of the binder material.

10 Claims, 5 Drawing Sheets

(52) U.S. Cl.
CPC .. *C04B 2235/405* (2013.01); *C04B 2235/427* (2013.01); *C04B 2235/5436* (2013.01); *C04B 2235/656* (2013.01)

(56) References Cited

U.S. PATENT DOCUMENTS

| | | | |
|---|---|---|---|
| 6,878,447 B2 | 4/2005 | Griffin et al. | |
| 7,462,003 B2* | 12/2008 | Middlemiss | B22F 7/06 407/119 |
| 7,516,804 B2 | 4/2009 | Vail | |
| 8,496,993 B2* | 7/2013 | Xiao | C23C 16/27 427/249.8 |
| 8,501,144 B1* | 8/2013 | Bertagnolli | B22F 7/06 423/446 |
| 8,882,872 B2* | 11/2014 | Mazyar | C01B 32/156 51/309 |
| 9,403,137 B2 | 8/2016 | Russell et al. | |
| 9,889,540 B2 | 2/2018 | Bird et al. | |
| 9,932,274 B2* | 4/2018 | Bertagnolli | G01N 27/80 |
| 2005/0019114 A1 | 1/2005 | Sung | |
| 2007/0009374 A1 | 1/2007 | Akaishi et al. | |
| 2007/0056778 A1 | 3/2007 | Webb et al. | |
| 2008/0073126 A1* | 3/2008 | Shen | E21B 10/5676 175/434 |
| 2009/0260895 A1* | 10/2009 | Vail | E21B 10/46 175/434 |
| 2011/0083908 A1* | 4/2011 | Shen | E21B 10/5676 175/428 |
| 2011/0252711 A1* | 10/2011 | Chakraborty | B82Y 30/00 51/298 |
| 2013/0081335 A1* | 4/2013 | Mazyar | C01B 32/05 51/309 |
| 2013/0149447 A1* | 6/2013 | Mazyar | C01B 32/05 427/249.8 |
| 2018/0305810 A1* | 10/2018 | Kumar | C23C 28/044 |

OTHER PUBLICATIONS

E. A. Ekimov, et al. Sintering of a Nanodiamond in the Presence of Cobalt, Inorganic Materials, May 2009, 491-494, 45-5, Pleiades Publishing, Ltd, Tortola, British Virgin Islands.

E. A. Ekimov, et al. High-pressure, High-temperature Synthesis of SiC-Diamond Nanocrystalline Ceramics, Applied Physics Letters, Aug. 14, 2000, 954-956, 77-7, AIP Publishing, LLC, New York, USA.

Hitoshi Sumiya. Novel Development of High-pressure Synthetic Diamonds 'Ultra-hard Nano-polycrystalline Diamonds', SEI Technical Review, Apr. 2012, 15-23, 74, Sumitomo Electric Industries Ltd, Osaka, Japan.

* cited by examiner

POLYCRYSTALLINE DIAMOND COMPRISING NANOSTRUCTURED POLYCRYSTALLINE DIAMOND PARTICLES AND METHOD OF MAKING THE SAME

CROSS-REFERENCE TO RELATED APPLICATION

This application claims the benefit of U.S. Provisional Patent Application Ser. No. 62/638,573, filed on Mar. 5, 2018, titled "Polycrystalline Diamond Comprising Nanostructured Polycrystalline Diamond Particles," the disclosure of which is incorporated herein in its entirety by this reference.

BACKGROUND OF THE INVENTION

Prior Art

The following is a tabulation of some prior arts that presently appear relevant:

| \_\_\_\_\_\_\_\_\_\_\_\_\_\_\_\_\_\_ U.S. Patents \_\_\_\_\_\_\_\_\_\_\_\_\_\_\_\_\_\_ | | | |
|---|---|---|---|
| Pat. No. | Kind Code | Issue Date | Patentee |
| 6,592,985 | B2 | 2003 Jul. 15 | Griffin et al. |
| 6,878,447 | B2 | 2005 Apr. 12 | Griffin et al. |
| 7,516,804 | B2 | 2009 Apr. 14 | Vail |
| 9,403,137 | B2 | 2016 Aug. 2 | Russell, et al. |
| 9,889,540 | B2 | 2018 Feb. 13 | Bird, et al. |
| 6,852,414 | B1 | 2005 Feb. 8 | Frushour |

| \_\_\_\_\_\_\_\_\_\_ U.S. Patent Application Publications \_\_\_\_\_\_\_\_\_\_ | | | |
|---|---|---|---|
| Publication Nr. | Kind Code | Publication Date | Applicant |
| 20050019114 | A1 | 2005 Jan. 27 | Sung |
| 20070009374 | A1 | 2007 Jan. 11 | Akaishi, et al. |
| 20070056778 | A1 | 2007 Mar. 15 | Webb, et al. |
| 20110252711 | A1 | 2011 Oct. 20 | Chakraborty, et al. |

Background of the Invention

The present disclosure relates to a polycrystalline diamond (PCD) and a polycrystalline diamond compact (PDC) used in various cutting, grinding, drilling, and as wear-resistant parts. More specifically, the present disclosure relates to the PCD and the PDC comprising nanostructured polycrystalline diamond particles with diamond-to-diamond (D-D) bond which forms during sintering under high temperature and high pressure (HTHP) in the presence of catalyst material.

A PCD is well known in prior arts. It is a sintered diamond material comprising a plurality of diamond particles with D-D bond. The PCD is formed by sintering and bonding together relatively small diamond particles under HTHP. Usually, a catalyst material is used during HTHP processing, which promotes D-D bond. Cobalt, nickel, iron, their alloys, or non-metallic materials such as silicon (Si), silicon carbide (SiC), magnesium carbonate ($MgCO_3$), calcium carbonate ($CaCO_3$) are typical catalyst materials. The small diamond particles are monocrystalline and micrometer-sized. The resulting sintered PCD consists of D-D bonded diamond particles and a binder (binder and catalyst material are exchangeable throughout the specification) that is located at the interstitial spaces among the diamond particles. Powdered catalyst material may be premixed with diamond particles prior to sintering the particles together under HTHP.

A PDC is also well known in prior arts, such as a PDC cutter that is widely used in fixed cutter bits and drilling tools in earth exploration and production. A PDC consists of a PCD layer and a cemented carbide body, where the PCD layer acts as a cutting edge and the cemented carbide body acts as a supporting substrate. For the fabrication of a PDC, a catalyst material is usually filled into a PCD layer by infiltration during sintering under HTHP. In general, a cemented carbide substrate is a cobalt-sintered tungsten carbide. In such the instance, during sintering under HTHP, cobalt (or other catalyst materials) in the PDC substrate may diffuse into the interstitial spaces among diamond particles and serve as the catalyst material for forming intergranular D-D bonds in a PCD layer, from the discrete diamond particles.

Worth to mention, both a PCD without a carbide substrate and a PDC with a carbide substrate can be prepared by sintering under HTHP with the presence of a catalyst material. The catalyst material may be provided by a premixture of diamond particles and powdered catalyst material, infiltration during sintering, their combinations, or any other methods.

Thermally stable polycrystalline diamond (TSPCD) refers herein to a PCD that contains none or a reduced amount of catalyst material such as cobalt. Usually, a leaching process is used to remove the catalyst material in an HTHP sintered PCD. It is a chemical or an electrochemical process. A caustic material such as an acid or a base solution may be used as a leaching agent. The leaching process is performed on an HTHP sintered PCD. Removal of the catalyst material such as cobalt would improve thermal resistance of a PCD substantially, as the catalyst material would favor graphitization of diamond and develop thermal stresses due to significant difference in thermal expansion coefficient between the catalyst material and diamond. Usually, leaching is just to remove the catalyst material around the surface and subsurface layer of a PCD, that is, partial leaching, while the rest unleached volume of the PCD remains intact, which keeps a good toughness of the PCD. A leaching depth is generally tens to hundreds of micrometers from the exterior surfaces of a PCD. Typical arts in this partial leaching PCD endeavor include U.S. Pat. Nos. 6,592,985 B2 and 6,878,447 B2, which are herein incorporated by reference in their entirety.

Thermally stable polycrystalline diamond (TSPCD) also refers herein to a PCD that contains non-metallic materials as catalyst materials. The non-metallic catalyst materials have thermal expansion coefficient closer to diamond than metallic catalyst materials. Thus, thermal stress is reduced substantially, and as a result, a TSPCD with a non-metallic catalyst material has a higher thermal stability. The non-metallic catalyst materials usually are silicon (Si), silicon carbide (SiC), magnesium carbonate ($MgCO_3$), calcium carbonate ($CaCO_3$), etc.

Thermally stable polycrystalline diamond compact (TSPDC) refers herein to a PDC consisting of a TSPCD layer and a cemented carbide substrate, wherein the TSPCD layer contains none or a reduced amount of catalyst material such as cobalt, such as a leached PDC cutter. Like TSPCD, most of TSPDC are partially leached, which has an excellent combination of thermal damage resistance, wear resistance, and toughness. Likely, TSPDC may also comprise a TSPCD layer that contains non-metallic materials as catalyst materials such as Si, SiC, MgCO$_3$, CaCO$_3$, etc. A PCD and a PDC are very successful as a cutting element in cutting, grinding, drilling, and as a wear-resistant part. However, it is noted that a conventional PCD or PDC comprises micrometer-sized monocrystalline diamond particles as its exclusive diamond constituents, and such the monocrystalline diamond particles have a low toughness and tend to cleavage under impact loading. It is hard to achieve an ideal combination of wear resistance and toughness for such the PCD or PDC.

Recently, the development of a PCD or PDC comprising nanometer-sized diamond particles receives much attentions. But, there is still a challenge in handling such the ultrafine particles during mixing and sintering. Typical arts in this subject endeavor include U.S. Pat. Nos. 6,878,447 B2, 7,516,804 B2, 9,403,137 B2, 9,889,540 B2, 6,852,414 B2, and U.S. Appl. Pat. Nos. 2005/0,019,114 A1, 2007/0,009,374 A1, 2007/0,056,778 A1, 2011/0,252,711, A1, which are herein incorporated by reference in their entirety.

The present disclosure has a primary objective of improving overall mechanical properties of a PCD or a PDC including wear resistance and toughness by modifying their constitutions.

SUMMARY OF THE INVENTION

The present disclosure relates to a PCD comprising nanostructured polycrystalline diamond particles with D-D bond. The PCD consists of diamond constituents and a small amount of binder material located at the interstitial spaces among the diamond constituents. The diamond constituents comprise nanostructured polycrystalline diamond particles (aggregates) and micrometer-sized monocrystalline diamond particles. The nanostructured polycrystalline diamond particles are from starting raw materials of Carbonado-type polycrystalline diamond particles (aggregates) with a size of between 1μ-40 μm, preferentially between 10 μm-40 μm, prior to HTHP sintering. The PCD may be leached partially or completely to remove the binder material at the interstitial spaces among the diamond constituents, to make a TSPCD.

The present disclosure also relates to a PDC comprising nanostructured polycrystalline diamond particles (aggregates). The PDC consists of a PCD layer and a cemented carbide substrate, wherein the PCD layer comprises the nanostructured polycrystalline diamond particles (aggregates) with D-D bond. The PCD layer may comprises either nanostructured polycrystalline diamond particles (aggregates) only, or a mixture of the nanostructured polycrystalline diamond particles (aggregates) and micrometer-sized monocrystalline diamond particles as diamond constituents. The nanostructured polycrystalline diamond particles (aggregates) are from starting raw materials of Carbonado-type, nanostructured, polycrystalline diamond particles (aggregates) with a size of between 1 μm-40 μm, preferentially between 10 μm-40 μm, prior to HTHP sintering. Besides the diamond constituents, the PCD layer contains a small amount of catalyst material that is located at the interstitial spaces among the diamond constituents. The sintered PDC may be leached partially or completely to remove the catalyst material at the interstitial spaces among the diamond constituents, to make a TSPDC.

Synthesis of a PCD or PDC comprising nanostructured polycrystalline diamond particles (aggregates) is by sintering under HTHP in the presence of catalyst material such as cobalt, nickel, iron, their alloys, Si, SiC, MgCO$_3$, CaCO$_3$, etc. The catalyst material may be provided by either a premixture of diamond particles and powdered catalyst material, infiltration during HTHP sintering, their combinations, or any other methods. Starting raw materials of diamond particles may be sole Carbonado-type nanostructured polycrystalline diamond particles (aggregates), or a mixture of the Carbonado-type nanostructured polycrystalline diamond particles (aggregates) and micrometer-sized monocrystalline diamond particles. The Carbonado-type nanostructured polycrystalline diamond particles (aggregates) have a size of between 1 μm-40 μm, preferentially between 10 μm-40 μm, and they are produced by a dynamic HTHP process.

DRAWING—REFERENCE NUMERALS 10 nanostructured polycrystalline diamond particles (aggregates)
12 binder at interstitial spaces among diamond particles
14 micrometer-sized monocrystalline diamond particles
16 empty interstitial spaces among diamond particles
18 cemented carbide substrate of a PDC
20 PCD layer of a PDC

DETAILED DESCRIPTION OF THE INVENTION

Carbonado diamond is one of natural polycrystalline diamonds, which comprises numerous diamond grains with D-D bond and with random crystal orientations. The Carbonado diamond is substantially free of catalyst materials. The Carbonado diamond has overall mechanical properties superior to monocrystalline diamond, which include strength and toughness. In fact, the invention and development of a conventional PCD and PDC are based on understanding of the Carbonado diamond.

Currently, synthetic Carbonado-type nanostructured polycrystalline diamond particles (aggregates) are commercially available, and their main applications are as lapping and polishing abrasives. They are synthesized by dynamic HTHP processes such as detonation (explosion synthesis) using graphite as a starting raw material. The graphite is an allotrope of diamond as a precursor of diamond synthesis. The explosion synthesis is a physics process. For detonation shock wave synthesis, directional explosion accelerates a metal plate and the flying metal plate hits a graphite-containing compact at a high speed of several thousands of meters per second. Shock wave generates extremely high temperature and high pressure in a very short time in the compact, and as a result, the graphite in the compact converts into Carbonado-type polycrystalline diamond particles. The graphite-containing compact may consist of graphite only, or a mixture of graphite and metals with or without resin. After purifying treatment, the Carbonado-type nanostructured polycrystalline diamond particles (aggregates) are substantially free of catalyst materials and have a purity of 99.0%-99.5% by weight, or even higher. They are in a sub-micrometer or micrometer scale, and consist of countless nanometer-sized diamond grains with random crystal orientations. These nanometer-sized diamond grains have strong D-D bonds, unlike agglomerates or clusters of nanometer-sized diamond particles synthesized by detonation of carbon-containing explosives within a detonation chamber. The nanometer-sized diamond particles in the agglomerates or clusters are loosely joined together, lack strong bonding, and easily broken by mechanical forces. In fact, the agglomerates consist of nanometer-sized monocrystalline diamonds (nanodiamonds) and they are not polycrystalline diamond particles at all. The Carbonado-type nanostructured polycrystalline diamond particles (aggregates), exhibit higher wear resistance and toughness than micrometer-sized monocrystalline diamond particles.

Embodiments of the disclosure relate to a PCD comprising nanostructured polycrystalline diamond particles with D-D bond. The PCD consists of diamond constituents and a small amount of catalyst material located at the interstitial spaces among the diamond constituents. The diamond constituents form a continuous network of diamond matrix. The PCD contains more than 90% by volume, preferentially more than 95% by volume of the diamond constituents. The diamond constituents comprise nanostructured polycrystalline diamond particles and micrometer-sized monocrystalline diamond particles. Furthermore, they may comprise other types of diamond particles such as sub-micrometer-sized monocrystalline diamond, nanodiamond, and an agglomerate or cluster of nanodiamond. The PCD is formed by sintering and bonding together diamond particles comprising Carbonado-type nanostructured polycrystalline diamond particles under HTHP in the presence of catalyst material.

Figure 1A:
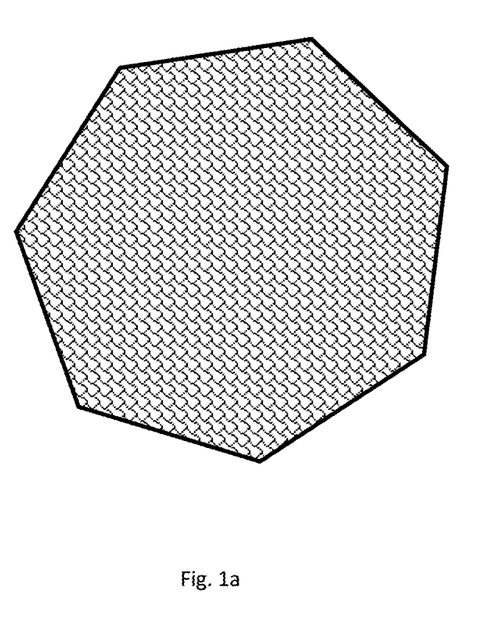
FIG. 1a is a schematic illustration of a microstructure of a Carbonado-type nanostructured polycrystalline diamond particle (aggregates) consisting of countless nanometer-sized diamond grains with D-D bond and with random crystal orientations.
Figure 1B:
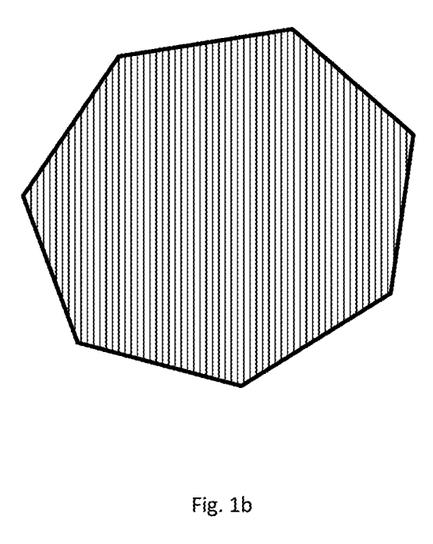
FIG. 1b is a schematic illustration of a microstructure of a micrometer-sized monocrystalline diamond particle consisting of a single diamond grain.

In embodiments of the disclosure, Carbonado-type nanostructured polycrystalline diamond particles (aggregates) are used as starting raw materials to make a PCD. In contrast, starting raw materials for making a conventional PCD are micrometer-sized monocrystalline diamond particles, as described before. FIG. 1a and FIG. 1b schematically show microstructures of a Carbonado-type nanostructured polycrystalline diamond particle (aggregates) and a micrometer-sized monocrystalline diamond particle, respectively. The Carbonado-type nanostructured polycrystalline diamond particle (aggregates) contains hundreds or even thousands of nanometer-sized diamond grains, which usually have a grain size of several to tens of nanometers. The nanometer-sized diamond grains bond each other via D-D bond and have random crystal orientations. The Carbonado-type nanostructured polycrystalline diamond particle (aggregates) itself is isotropic in mechanical properties and thus, has a higher toughness. The micrometer-sized monocrystalline diamond particle consists of a single diamond grain only. It is anisotropic in mechanical properties, has a lower toughness, and tends to cleavage upon impact loading. It should be apparent that the dimensions illustrated in FIG. 1 are exaggerated for purposes of illustration and in practice they are extremely small. The similar illustrations are also in FIGS. 2-4.

Figure 2:
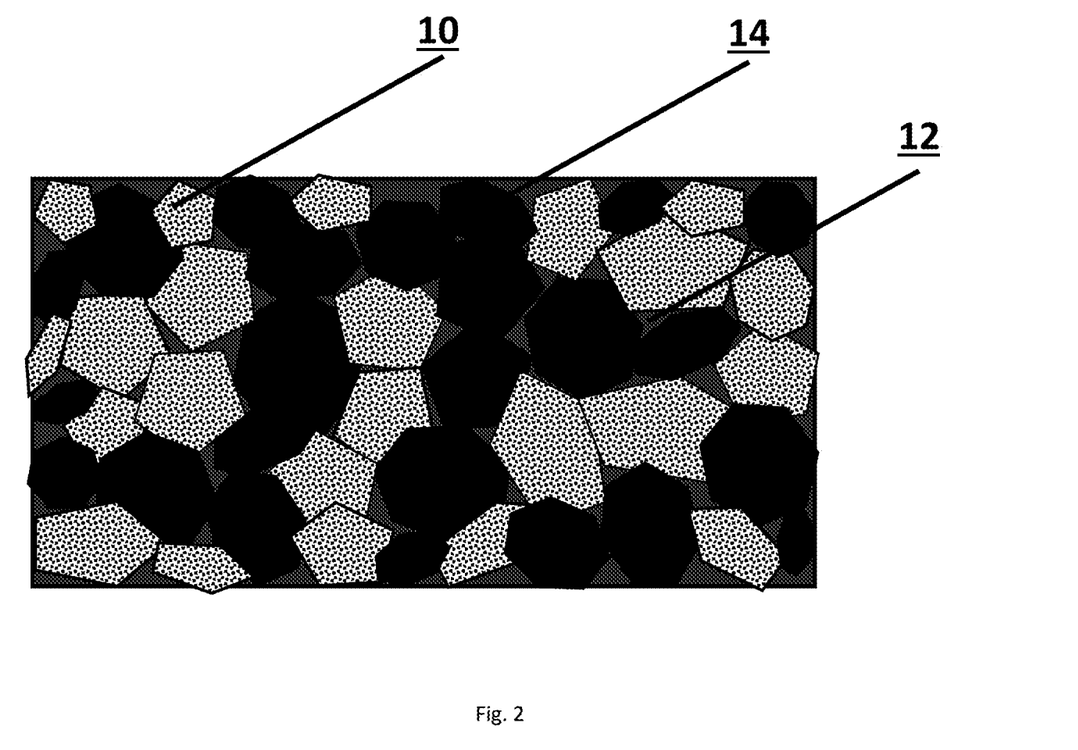
FIG. 2 is a schematic illustration of a microstructure of a PCD comprising nanostructured polycrystalline diamond particles (aggregates), micrometer-sized monocrystalline diamond particles, and a binder, wherein the nanostructured polycrystalline diamond particles and the micrometer-sized monocrystalline diamond particles are the diamond constituents.

In another embodiment of the disclosure, a PCD comprises diamond constituents and a binder. The diamond constituents comprise nanostructured polycrystalline diamond particles (aggregates) and micrometer-sized monocrystalline diamond particles as diamond constitutions. Furthermore, they may comprise other types of diamond particles such as sub-micrometer-sized monocrystalline diamond, nanodiamond, and an agglomerate or cluster of nanodiamond. In the PCD, various mass ratio of the nanostructured polycrystalline diamond particles (aggregates) to the micrometer-sized monocrystalline diamond particles can be utilized, such as 2:1, 1:1, 1:2, etc. The content of nanostructured polycrystalline diamond particles in a PCD is larger than 1% by volume, preferentially larger than 10% by volume. FIG. 2 schematically shows a microstructure of the PCD. Diamond constituents including both nanostructured polycrystalline diamond particles (aggregates) 10 and micrometer-sized monocrystalline diamond particles 14 bond each other via D-D bond. A binder 12 is located at the interstitial spaces among the diamond constituents.

Figure 3:
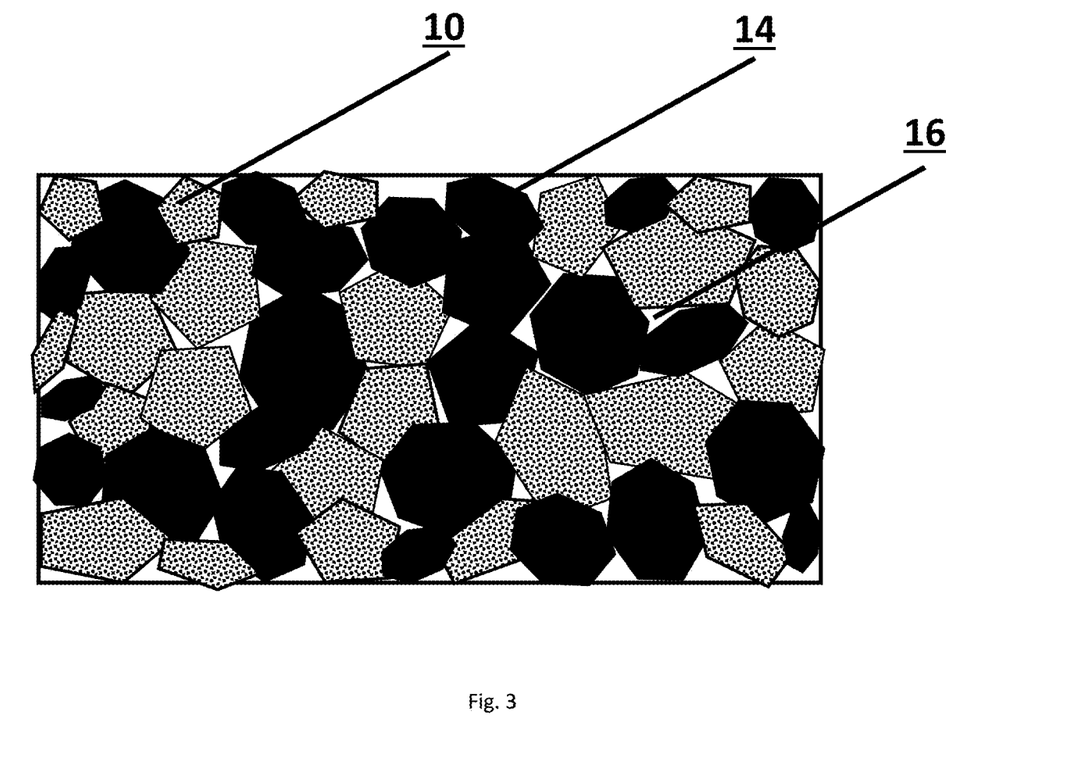
FIG. 3 is a schematic illustration of a microstructure of a leached PCD (TSPCD) comprising both nanostructured polycrystalline diamond particles (aggregates) and micrometer-sized monocrystalline diamond particles, wherein they are the diamond constituents and a binder is removed by a leaching process.

In another embodiment of the disclosure, a TSPCD comprises diamond constituents and none or a reduced amount of binder. The diamond constituents comprise nanostructured polycrystalline diamond particles (aggregates) and micrometer-sized monocrystalline diamond particles. Furthermore, they may comprise other types of diamond particles such as sub-micrometer-sized monocrystalline diamond, nanodiamond, and an agglomerate or cluster of nanodiamond. A binder in the TSPCD is removed partially or completely by a leaching process. The TSPCD has a leaching depth of at least 10 µm. In the TSPCD, various mass ratio of the nanostructured polycrystalline diamond particles to the micrometer-sized monocrystalline diamond particles can be utilized, such as 2:1, 1:1, 1:2, etc. The content of nanostructured polycrystalline diamond particles (aggregates) in a TSPCD is larger than 1% by volume, preferentially larger than 10% by volume. FIG. 3 schematically shows a microstructure of the TSPCD without a binder. The diamond constituents including both nanostructured polycrystalline diamond particles (aggregates) 10 and micrometer-sized monocrystalline diamond particles 14 bond each other via D-D bond. There exist empty interstitial spaces 16 among the diamond constituents, wherein a binder is removed completely by a leaching process.

In another embodiment of the disclosure, a TSPCD comprises diamond constituents and a non-metallic material binder. The diamond constituents comprise nanostructured polycrystalline diamond particles (aggregates) and micrometer-sized monocrystalline diamond particles. Furthermore, they may comprise other types of diamond particles such as sub-micrometer-sized monocrystalline diamond, nanodiamond, and an agglomerate or cluster of nanodiamond. In the TSPCD, various mass ratio of the nanostructured polycrystalline diamond particles (aggregates) to the micrometer-sized monocrystalline diamond particles can be utilized, such as 2:1, 1:1, 1:2, etc. The content of nanostructured polycrystalline diamond particles (aggregates) in a TSPCD is larger than 1% by volume, preferentially larger than 10% by volume. The non-metallic material binders are selected from the group consisting of Si, SiC, $MgCO_3$, $CaCO_3$, etc.

Figure 4:
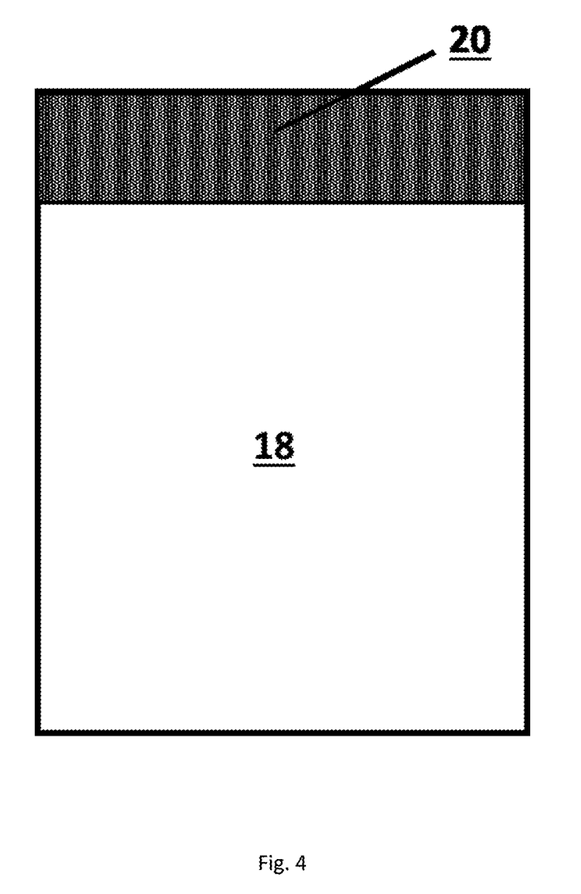
FIG. 4 is a schematic illustration of a cross sectional view of a cylindrical PDC consisting of a PCD layer and a cemented carbide substrate, wherein the PCD layer comprises nanostructured polycrystalline diamond particles (aggregates) or a mixture of the nanostructured polycrystalline diamond particles (aggregates) and micrometer-sized monocrystalline diamond particles as the diamond constituents, and a binder.

In another embodiment of the disclosure, a PDC comprises nanostructured polycrystalline diamond particles (aggregates). The PDC consists of a PCD layer and a cemented carbide substrate, wherein the PCD layer consists of diamond constituents and a small amount of catalyst material located at the interstitial spaces among the diamond constituents. The diamond constituents form a continuous network of diamond matrix. The PCD layer contains more than 90% by volume, preferentially more than 95% by volume, of the diamond constituents. The diamond constituents comprise either the nanostructured polycrystalline diamond particles (aggregates) only, or a mixture of the nanostructured polycrystalline diamond particles (aggregates) and micrometer-sized monocrystalline diamond particles. Furthermore, they may comprise other types of diamond particles such as sub-micrometer-sized monocrystalline diamond, nanodiamond, and an agglomerate or cluster of nanodiamond. The main difference in constitution between a PCD and a PDC is if there exists a cemented carbide supporting substrate. Therefore, all embodiments of the disclosure for a PCD as described previously are applicable to a PDC. FIG. 4 schematically shows a cross sectional view of a cylindrical PDC. A PCD layer 20 bonds to a cemented carbide substrate 18. The PCD layer 20 may consists of either nanostructured polycrystalline diamond particles (aggregates) only, or a mixture of the nanostructured polycrystalline diamond particles (aggregates) and micrometer-sized monocrystalline diamond particles as diamond constituents, and a binder. Furthermore, they may comprise other types of diamond particles such as sub-micrometer-sized monocrystalline diamond, nanodiamond, and an agglomerate of cluster of nanodiamond. Like TSPCD, a binder may be leached partially or completed to form a TSPDC. In the disclosure, a TSPDC has a leaching depth of at least 10 μm. A leached PDC, i.e., TSPDC, has excellent resistance to thermal damages.

In another embodiment of the disclosure, a TSPDC comprises a TSPCD layer and a cemented carbide substrate. The TSPCD layer comprises diamond constituents and a non-metallic material binder. The diamond constituents comprise either nanostructured polycrystalline diamond particles (aggregates) only, or a mixture of nanostructured polycrystalline diamond particles (aggregates) and micrometer-sized monocrystalline diamond particles. Furthermore, they may comprise other types of diamond particles such as sub-micrometer-sized monocrystalline diamond, nanodiamond, and an agglomerate or cluster of nanodiamond. The non-metallic material binders are selected from the group consisting of Si, SiC, $MgCO_3$, $CaCO_3$, etc.

According to the disclosure, nanostructured polycrystalline diamond particles (aggregates) and micrometer-sized monocrystalline diamond particles in a PCD or a PDC are predominantly in a micrometer scale, that is, in a range of between 1 μm-40 μm, preferentially between 10 μm-40 μm. Worthy to mention, the particles in as-sintered PCD or PDC may be smaller than their starting raw materials due to being crushed during HTHP sintering, or larger than their starting raw materials due to recrystallization during HTHP sintering. They may be in various shapes, preferentially blocky.

According to the disclosure, a binder material in a PCD or a PDC is either a metallic catalyst material selected from the group consisting of cobalt, nickel, iron, and their alloys, or a non-metallic material selected from the group consisting of Si, SiC, $MgCO_3$, $CaCO_3$, etc. After HTHP sintering, the binder material remains at the interstitial spaces among diamond constituents. Besides the binder material, the PCD or the PDC may contain a small amount of a compound such as carbide, nitride, etc. The compound may inhibit diamond overgrowing during HTHP sintering. Powdered compound or metal/alloy may be added into starting mixed materials. The metal/alloy may react with carbon atoms from diamond to form a carbide during HTHP sintering, which acts as an inhibitor of diamond grain growth.

In another embodiment of the disclosure, synthesis of a PCD or a PDC comprising nanostructured polycrystalline diamond particles (aggregates) is via sintering under HTHP in the presence of a catalyst material. The catalyst material can be provided by a premixture of powdered catalyst material with diamond particles, infiltration during HTHP sintering, their combination, or any other methods. Regarding HTHP, temperature is between 1000° C.-1700° C., pressure is between 4 GPa-10 GPa, and holding time is between 0.5 min.-30 min.

According to the disclosure, Carbonado-type nanostructured polycrystalline diamond particles (aggregates) are used as starting raw materials to make a PCD or a PDC comprising nanostructured polycrystalline diamond particles. The Carbonado-type nanostructured polycrystalline diamond particles (aggregates) have a micrometer size of between 1 μm-40 μm, preferentially between 10 μm-40 μm, and a nanometer-sized grain structure (grain size smaller than 100 nm), and they are produced by a detonation process (explosion synthesis) such as detonation shock wave synthesis. The Carbonado-type nanostructured polycrystalline diamond particles (aggregates) are different from nanometer-sized diamond particles and their agglomerates or clusters that are synthesized by detonation of carbon-containing explosives within a detonation chamber. The synthesis of nanometer-sized diamond particles and their agglomerates or clusters by detonation of carbon-containing explosives within a detonation chamber is a chemistry process. The nanometer-sized diamond particles and their agglomerates or clusters are not polycrystalline, but monocrystalline particles. The nanometer-sized diamond particles and their agglomerates or clusters absorb a large amount of volatile materials, which would prevent the diamond particles from sintering. The nanostructured polycrystalline diamond particles (aggregates) in the PCD or the PDC are from starting raw material of Carbonado-type nanostructured polycrystalline diamond particles (aggregates) and they inherit the nanostructure of the Carbonado-type nanostructured polycrystalline diamond particles (aggregates). Furthermore, micrometer-sized monocrystalline diamond particles may be used to form a mixture with the Carbonado-type nanostructured polycrystalline diamond particles (aggregates) as starting raw materials. The starting Carbonado-type nanostructured polycrystalline diamond particles (aggregates) and micrometer-sized monocrystalline diamond particles may be in various shapes, preferentially blocky.

In other embodiment, a PDC including TSPDC comprising nanostructured polycrystalline diamond particles (aggregates) may be mounted on a fixed cutter drill bit as a cutting element for earth boring application. In earth boring application, a PDC is generally referred to as a PDC cutter. The PDC cutter including TSPDC cutter comprises nanostructured polycrystalline diamond particles (aggregates) in its PCD layer which inherits nanostructure characteristics of starting raw material—Carbonado-type nanostructured polycrystalline diamond particles (aggregates). A fixed cutter drill bit comprises a plurality of PDC cutters and a bit body. The bit body is either a steel or a matrix body that is a composite of carbide and metal binder. The PDC or TSPDC cutter comprising nanostructured polycrystalline diamond particles (aggregates) would improve performance of a fixed cutter drill bit.

Examples are provided below to illustrate the working of the embodiments, but such the examples are by no means considered restrictive.

Example 1: Synthesis of PCD Comprising Nanostructured Polycrystalline Diamond Particles (Aggregates)

Carbonado-type nanostructured diamond particles (aggregates) and micrometer-sized monocrystalline diamond particles were commercial products as starting raw materials for synthesis of PDC cutters. The Carbonado-type nanostructured diamond particles (aggregates) were synthesized by a detonation shock wave method. They contain 99.0%-99.5% by weight of diamond, have a nominal size of 10 micrometers and a blocky shape. The micrometer-sized monocrystalline diamond particles were synthesized by static HTHP. They contain 99.5% by weight of diamond, and have a nominal size of 10 micrometers and a blocky shape. A mixture of the nanostructured diamond particles (aggregates) and the micrometer-sized monocrystalline diamond particles with a weight ratio of 1:1 was prepared. The mixed diamond particles were purified by a base solution and an acid solution at elevated temperatures, respectively. The treatment of the base solution is to heat a mixture of the diamond particles and NaOH with a volume ratio of 1:5 to 500° C.-700° C. for 10 minutes. After cooling, the mixture was resinsed with distilled water till a resinsing solution is neutral and then, dried. The treatment of the acid solution is to heat a mixture of mixed HCl and $H_2SO_4$ with a volume ratio of 1:1, and the diamond particles with a volume ratio of 1:5 to boiling for 60 minutes. After cooling, the mixture was resinsed with distilled water till a resinsing solution is neutral, and then, dried. Highly pure cobalt powder and tungsten carbide powder with a size of about 100 nanometers were used as a binder and an additive, respectively. 10 wt. % of cobalt powder, 3 wt. % of tungsten carbide powder and 87 wt. % of the diamond particles were mixed at a ball miller for 24 hours. Then, the mixture were heated in a vacuum electric resistant furnace to 600° C.-900° C. for 1 hour-5 hours in a vacuum of 0.1 Pa for degassing. The mixture was placed in a niobium can and then, sintered at a temperature of 1100° C.-1400° C., a pressure of 4.5 GPa-6 GPa for 3 min.-15 min. to form a PCD comprising nanostructured polycrystalline diamond particles.

Example 2: Synthesis of PDC Cutters Comprising Nanostructured Polycrystalline Diamond Particles (Aggregates)

Starting materials of Carbonado-type nanostructured diamond particles (aggregates) and micrometer-sized monocrystalline diamond particles, and cleaning and degassing processes are the same as in Example 1. Cobalt-cemented tungsten carbide (WC-13 wt. %) was used as a supporting substrate of a PDC cutter. Two kinds of PDC cutters were prepared. One took the Carbonado-type nanostructured diamond particles (aggregates) as sole diamond constituent, and other took a mixture of Carbonado-type nanostructured diamond particles (aggregates) and the micrometer-sized monocrystalline diamond particles with a mass ratio of 1:1 as diamond constituents. The diamond particles and the carbide substrate were placed in a niobium can and then, sintered at a temperature of 1350° C.-1550° C. and a pressure of 4.5 GPa-8 GPa for 3 min.-15 min. to form the PDC cutters comprising nanostructured polycrystalline diamond particles (aggregates).

Example 3: Synthesis of TSPCD and TSPDC Cutter Comprising Nanostructured Polycrystalline Diamond Particles (Aggregates)

As sintered PCD and PDC cutter comprising nanostructured polycrystalline diamond particles (aggregates) which were synthesized in Examples 1 and 2 respectively, were used to prepare the TSPCD and TSPDC cutter comprising nanostructured polycrystalline diamond particles (aggregates). The PCD and PDC cutters were leached with a mixed solution of nitric acid ($HNO_3$) and hydrochloric acid (HCl) with a volume ratio of 1:3. The leaching depth is 0.2 mm for both the PCD and the PDC cutter comprising nanostructured polycrystalline diamond particles (aggregates).

Advantageously, embodiments of the present disclosure provide a PCD or a PDC with improved mechanical properties. The manufacturing methods are similar to the HTHP sintering of a conventional PCD or PDC, and thus, suitable for mass production.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention as claimed.

The invention claimed is:

1. A polycrystalline diamond compact comprising:
   a cemented carbide body as a supporting substrate;
   a polycrystalline diamond layer comprising:
      diamond constituents comprising nanostructured polycrystalline diamond particles (aggregates) with a particle size of between 1 μm-40 μm, wherein the particles or aggregates consist of nanometer-sized diamond grains; and
      binder material, wherein the binder material is located at the interstitial spaces among the diamond constituents.

2. The polycrystalline diamond layer as in claim 1, wherein the diamond constituents comprise micrometer-sized monocrystalline diamond particles, wherein the particle size is between 1 μm-40 μm.

3. The polycrystalline diamond layer as in claim 1, wherein the binder material is a metallic catalyst material selected from the group consisting of cobalt, nickel, iron and alloys thereof.

4. The polycrystalline diamond layer as in claim 1, wherein the binder material is a non-metallic material selected from the group consisting of silicon, silicon carbide, magnesium carbonate and calcium carbonate.

5. A fixed cutter drill bit comprising:
   a fixed cutter drill bit body;
   at least one polycrystalline diamond compact mounted on the body as claimed in claim 1 comprising:
      a tungsten carbide substrate;
      a polycrystalline diamond layer formed over the substrate comprising:

diamond constituents comprising nanostructured polycrystalline diamond particles or aggregates, wherein the particle size is between 1 µm-40 µm, wherein the particles or aggregates consist of nanometer-sized diamond grains; and binder material, wherein the binder material is located at the interstitial spaces among the diamond constituents.

6. The polycrystalline diamond layer as in claim 5, wherein the diamond constituents comprise micrometer-scale monocrystalline diamond particles, wherein the particle size is between 1 µm-40 µm.

7. The polycrystalline diamond layer as in claim 5, wherein the binder material is a metallic catalyst material selected from the group consisting of cobalt, nickel, iron and alloys thereof.

8. The polycrystalline diamond layer as in claim 5, wherein the binder material is a non-metallic material selected from the group consisting of silicon, silicon carbide, magnesium carbonate and calcium carbonate.

9. The polycrystalline diamond layer as in claim 3, wherein the polycrystalline diamond layer with an exterior surface consists of a first volume remote from the exterior surface and a second volume adjacent to the exterior surface, wherein the first volume contains the metallic catalyst material, and at least a portion of the second volume is substantially free of the metallic catalyst material to a depth of at least 10 µm from the exterior surface.

10. The polycrystalline diamond layer as in claim 7, wherein the polycrystalline diamond layer with an exterior surface consists of a first volume remote from the exterior surface and a second volume adjacent to the exterior surface, wherein the first volume contains the metallic catalyst material, and at least a portion of the second volume is substantially free of the metallic catalyst material to a depth of at least 10 µm from the exterior surface.

* * * * *